US010010991B2

(12) United States Patent
Takahashi et al.

(10) Patent No.: US 10,010,991 B2
(45) Date of Patent: Jul. 3, 2018

(54) STATE MEASURING DEVICE AND STATE MEASURING SYSTEM

(71) Applicant: Kobe Steel, Ltd., Hyogo (JP)

(72) Inventors: Eiji Takahashi, Kobe (JP); Kaname Araki, Kobe (JP); Masato Kannaka, Kobe (JP); Koyo Kegasa, Kobe (JP); Katsuhiko Ozaki, Kobe (JP); Koichi Akazawa, Kobe (JP); Hiroyuki Kamura, Kobe (JP); Yuya Yamamoto, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 153 days.

(21) Appl. No.: 15/026,388

(22) PCT Filed: Sep. 4, 2014

(86) PCT No.: PCT/JP2014/073362
§ 371 (c)(1),
(2) Date: Mar. 31, 2016

(87) PCT Pub. No.: WO2015/056495
PCT Pub. Date: Apr. 23, 2015

(65) Prior Publication Data
US 2016/0303698 A1 Oct. 20, 2016

(30) Foreign Application Priority Data
Oct. 17, 2013 (JP) .................. 2013-216378

(51) Int. Cl.
*B23Q 17/09* (2006.01)
*H04Q 9/00* (2006.01)
(Continued)

(52) U.S. Cl.
CPC ......... *B23Q 17/0985* (2013.01); *B23Q 17/00* (2013.01); *B23Q 17/09* (2013.01);
(Continued)

(58) Field of Classification Search
CPC .... B23Q 17/00; B23Q 17/09; B23Q 17/0957; B23Q 17/0966; B23Q 17/0985;
(Continued)

(56) References Cited

U.S. PATENT DOCUMENTS 7,357,197 B2 * 4/2008 Schultz .................. E21B 12/02
175/39
8,316,742 B2 * 11/2012 Craig ...................... B23B 51/00
82/1.11
(Continued)

FOREIGN PATENT DOCUMENTS

JP H03-505066 A 11/1991
JP 2001-030142 A 2/2001
(Continued)

OTHER PUBLICATIONS

International Search Report; PCT/JP2014/073362; dated Nov. 25, 2014.
(Continued)

*Primary Examiner* — Francis Gray
(74) *Attorney, Agent, or Firm* — Studebaker & Brackett PC

(57) ABSTRACT

The state measuring device includes a measurement section attached to the blade portion or to a vicinity of the blade portion to measure a state of the blade portion, an AD converter attached to the cutting tool to acquire a measurement value measured by the measurement section at a predetermined sampling rate and perform AD conversion on the measurement value, a transmission section which transmits, on each acquisition of the measurement value from the AD converter, the acquired measurement value using digital wireless communication, and a monitor device provided outside the cutting tool. The monitor device includes a reception section which receives the measurement value transmitted by the transmission section, and a data management section which causes a display section to display the measurement value and causes a storage section to store the (Continued)

measurement value on each reception of the measurement value by the reception section.

7 Claims, 6 Drawing Sheets

(51) Int. Cl.
    *G01K 13/08*     (2006.01)
    *B23Q 17/00*     (2006.01)
    *G01D 21/02*     (2006.01)
    *G01B 7/28*     (2006.01)

(52) U.S. Cl.
    CPC ..... *B23Q 17/0957* (2013.01); *B23Q 17/0966* (2013.01); *G01B 7/28* (2013.01); *G01D 21/02* (2013.01); *G01K 13/08* (2013.01); *H04Q 9/00* (2013.01); *H04Q 2209/40* (2013.01)

(58) Field of Classification Search
    CPC .......... G01B 7/28; G01D 21/02; G01K 13/08; H04Q 2209/40; H04Q 9/00
    See application file for complete search history.

(56) References Cited

U.S. PATENT DOCUMENTS

| | | | | |
|---|---|---|---|---|
| 2003/0030565 | A1* | 2/2003 | Sakatani | ................ G01H 1/003 340/679 |
| 2003/0164052 | A1* | 9/2003 | Karrip | ................ B23Q 17/2225 73/865.9 |
| 2006/0145881 | A1 | 7/2006 | Sakatani et al. | |
| 2006/0159533 | A1* | 7/2006 | Zeiler | .................... B23B 45/00 408/226 |
| 2009/0165621 | A1 | 7/2009 | Tzschentke et al. | |
| 2010/0145496 | A1* | 6/2010 | Tang | ...................... B23Q 17/00 700/174 |
| 2010/0186560 | A1 | 7/2010 | Tzschentke et al. | |

FOREIGN PATENT DOCUMENTS

| | | |
|---|---|---|
| JP | 2007-323665 A | 12/2007 |
| JP | 2008-254080 A | 10/2008 |
| JP | 2009-525195 A | 7/2009 |
| JP | 2010-234464 A | 10/2010 |
| JP | 2012-020359 A | 2/2012 |
| KR | 10-0449601 B1 | 9/2004 |
| WO | 89/12528 A1 | 12/1989 |

OTHER PUBLICATIONS

Notification of Transmittal of Translation of the International Preliminary Report on Patentability and Translation of Written Opinion of the International Searching Authority; PCT/JP2014/073362 dated Apr. 28, 2016.

* cited by examiner

STATE MEASURING DEVICE AND STATE MEASURING SYSTEM

TECHNICAL FIELD

The present invention relates to a technique which measures the state of the blade portion of a cutting tool during cutting.

BACKGROUND ART

In recent years, to detect a point for improvement in a machine tool such as a milling machine, it has been requested to monitor the state of the blade portion of a cutting tool during cutting in real time. As a technique which detects the machining state of a machine tool, e.g., Patent Literature 1 is known. Patent Literature 1 discloses a technique which attaches a thermocouple to the cutting edge of a machine tool to detect the temperature of the cutting edge and detects the machining state of the machine tool on the basis of the detected temperature. Specifically, in Patent Literature 1, the machining state is determined using a correlationship such that a change in the temperature of the cutting edge is proportional to the amount of cutting (cutting depth).

On the other hand, in Patent Literature 2, it is disclosed that a sensor such as a vibration sensor, a rotation sensor, or a temperature sensor is attached to a wireless sensor, the identification information of the sensor is added to detection information resulting from detection by the sensor, the detection information is transmitted to a management device using radio waves, and the management device categorizes the detection information on the basis of the identification information and stores the detection information. Here, in Patent Literature 2, in the case where the sensor is attached to a rotation shaft mounted in a working machine, a vehicle, or the like, when the sensor and the management device are connected with a communication line, the communication line is broken so that the detection information is wirelessly transmitted to the management device.

However, in Patent Literature 1, a tool bit is assumed as the cutting tool and a cutting tool configured of a rotating body as assumed in the present application is not assumed. Also, in Patent Literature 1, only the temperature of the cutting edge is assumed to be a measurement target. This presents a problem in that a change in the state of the cutting edge can be measured only with a macro resolving power of the order of seconds and high-resolution measurement cannot be performed.

Also, in Patent Literature 2, the detection information resulting from the detection by the sensor is wirelessly transmitted to the management device. However, the management device only categorizes the detection information on the basis of the identification information and stores the detection information and does not display the detection information in real time on a display section.

CITATION LIST

Patent Literatures

Patent Literature 1: Japanese Unexamined Patent Publication No. 2001-30142
Patent Literature 2: Japanese Unexamined Patent Publication No. 2007-323665

SUMMARY OF INVENTION

An object of the present invention is to provide a state measuring device and a state measuring system which are capable of real-time display.

A state measuring device according to an aspect of the present invention is a state measuring device which measures a state of a cutting tool during cutting. The cutting tool is configured of a rotating body which has one or more blade portions and brings each of the blade portions into contact with a workpiece while rotating, to work the workpiece. The state measuring device includes one or more measurement sections attached to the blade portion or to a vicinity of the blade portion to measure a state of the blade portion, an AD converter attached to the cutting tool to acquire a measurement value measured by each of the measurement sections at a predetermined sampling rate and perform AD conversion on the measurement value, a transmission section which transmits, on each acquisition of the measurement value from the AD converter, the acquired measurement value using digital wireless communication, and a monitor device provided outside the cutting tool. The monitor device includes a reception section which receives the measurement value transmitted by the transmission section, and a data management section which causes a display section to display the measurement value and causes a storage section to store the measurement value on each reception of the measurement value by the reception section.

The present configuration allows a measurement value from a cutting tool during cutting to be displayed in real time.

DESCRIPTION OF EMBODIMENTS

Figure 1:
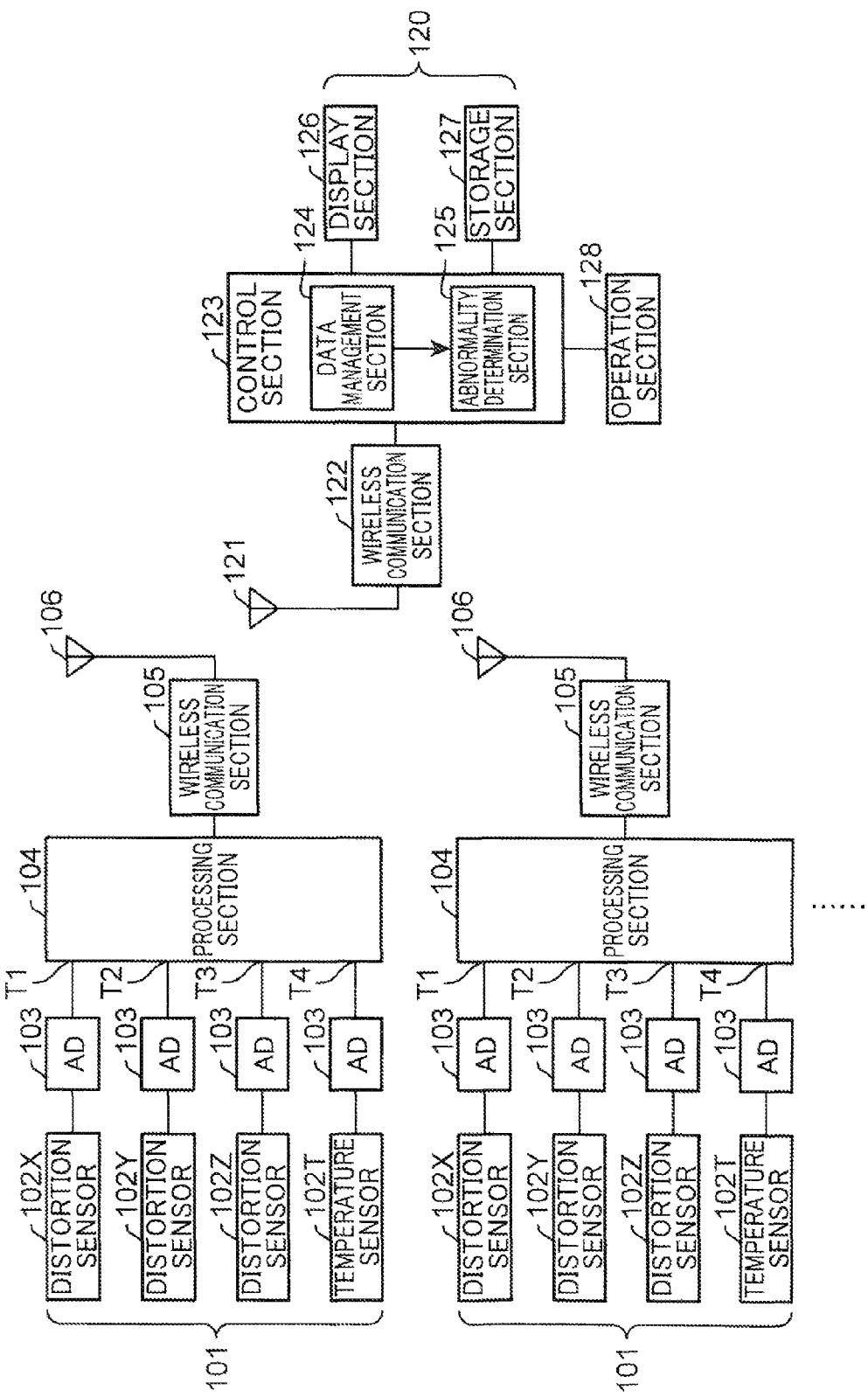
FIG. 1 is a block diagram showing a configuration of a state measuring device according to an embodiment of the present invention.

FIG. 1 is a block diagram showing a configuration of a state measuring device according to an embodiment of the present invention. The state measuring device measures the state of a cutting tool during cutting. As the cutting tool, a rotating body is used which has one or more blade portions and brings the blade portions into contact with a workpiece while rotating, to work the workpiece. Specifically, as the cutting tool, the cutting tool of a milling machine is used. The following description will be given on the assumption that there are N (N is an integer of 2 or more) blade portions. However, the number of the blade portions may also be 1.

The state measuring device includes N measurement units 101 corresponding to the N blade portions and one monitor device 120. Each of the measurement units 101 includes distortion sensors 102X, 102Y, and 102Z, a temperature sensor 102T, an AD converter 103, a processing section 104, a wireless communication section 105, and an antenna 106. The processing section 104, the wireless communication section 105, and the antenna 106 are included in a transmission section. Each of the distortion sensors 102X, 102Y, and 102Z is formed of a uniaxial distortion gauge. The distortion sensors 102X, 102Y, and 102Z are attached to each of the blade portions or the vicinity of each of the blade portions to measure, as a state, the distortion (shape change) of each of blade portions 202 along the X-, Y-, and Z-axes shown in Section (B) of FIG. 2. As each of the distortion sensors 102X, 102Y, and 102Z, the distortion gauge is used, but it is a mere example and a piezoelectric element may also be used. As the piezoelectric element, e.g., a piezo-type piezoelectric element can be used.

The temperature sensor 102T is configured of, e.g., a thermocouple and attached to each of the blade portions 202 to detect the temperature of the blade portion 202 as a state.

Figure 2:
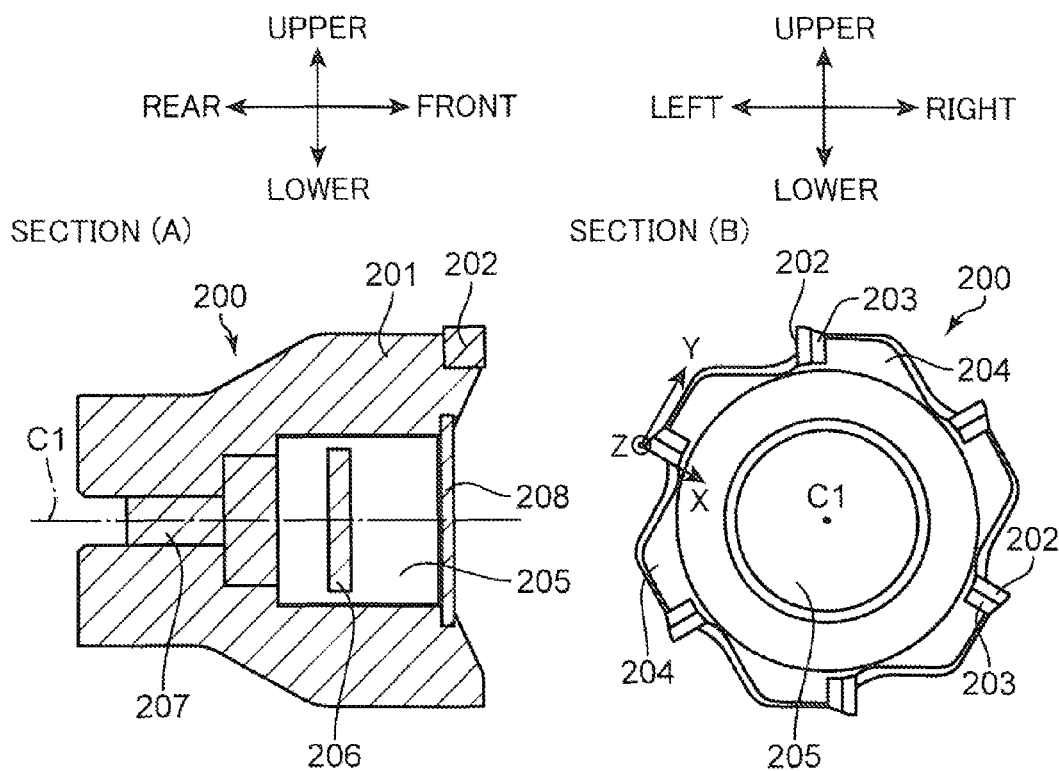
FIG. 2 is a view showing a cutting tool serving as a measurement target, in which Section (A) is a cross-sectional view of the cutting tool viewed from a front-rear direction and Section (B) is a front view of the cutting tool.

The AD converter 103 is mounted on a circuit board 206 provided in a space portion 205 of a holder 201 shown in FIG. 2 to retrieve a measurement value from the corresponding one of the distortion sensors 102X to 102Z or from the temperature sensor 102T at a predetermined sampling rate, perform AD conversion on the measurement value, and output a digital measurement value to the processing section 104. Here, as the predetermined sampling rate, a value of the order of kilohertz such as, e.g., 1 kHz, 10 kHz, or 100 kHz is used.

The processing section 104 is configured of, e.g., a microcomputer including a CPU, a ROM, and a RAM or a dedicated hardware circuit such as an ASIC and mounted on the circuit board 206. Upon each acquisition of the digital measurement value resulting from the AD conversion by the AD converter 103 from the AD converter 103, the processing section 104 adds identification information to the acquired measurement value to generate transmission data and outputs the transmission data to the wireless communication section 105. Here, the identification information is information for identifying from which one of the distortion sensors 102X to 102Z and the temperature sensor 102T the measurement value has been output. In the present embodiment, there are N sets of the distortion sensors 102X to 102Z and the N temperature sensors 102T so that there are 4×N types of the identification information.

Note that, as an example of the code system of the identification information, a symbol string obtained by combining the identification codes of the blade portions 202 with the identification codes of the distortion sensors 102X to 102Z and the temperature sensor 102T can be used. For example, it is assumed that, as the identification codes of the blade portions 202, H01, H02, . . . , and H0N are used and, as the identification codes of the distortion sensors 102X to 102Z and the temperature sensor 102T, S01, S02, . . . , and S04 are used. In this case, the identification information of the distortion sensor 102X at the blade portion 202 having the identification code H01 is represented as, e.g., H01-S01. This allows the monitor device 120 to identify the sensor and the blade portion 202 each used to provide the measurement value, from the identification information of the received measurement value.

The processing section 104 includes ports T1 to T4. To the ports T1 to T3, the distortion sensors 102X, 120Y, and 102Z are connected via the respective AD converters 103. To the port T4, the temperature sensor 102T is connected via the AD converter 103. Here, the processing section 104 may appropriately add the identification information to the measurement values such that the identification information determined in advance for the distortion sensor 102X to which the port T1 is connected is added to the measurement value input to the port T1 and the identification information determined in advance for the distortion sensor 102Y to which the port T2 is connected is added to the measurement value input to the port T2.

The wireless communication section 105 is mounted on the circuit board 206. The wireless communication section 105 is configured of a communication module corresponding to, e.g., a Bluetooth (registered trademark) communication protocol. On each acquisition of the transmission data output from the processing section 104, the wireless communication section 105 modulates the acquired transmission data and outputs the modulated transmission data to the antenna 106. Thus, measurement values resulting from the measurement by the distortion sensors 102X, 102Y, and 102Z and the temperature sensor 102T are transmitted in real time to the monitor device 120. The monitor device 120 can display the measurement values in real time on a display section 126.

Here, the wireless communication section 105 may appropriately modulate the transmission data by spectrum spreading and transmit the modulated transmission data by time division multiplexing. As the manner in which the wireless communication section 105 performs spectrum spreading, various forms can be used. The following assumes that one PN code is allocated to each of the wireless communication sections 105 and the wireless communication section 105 modulates four transmission data items corresponding to the distortion sensors 102X, 102Y, and 102Z and the temperature sensor 102T using the PN code allocated thereto and transmits the modulated four transmission data items by time division multiplexing. However, this is exemplary and it may also be possible that one PN code is allocated to each of 4×N types of transmission data and each of the wireless communication sections 105 modulates the four transmission data items corresponding to the distortion sensors 102X, 102Y, and 102Z and the temperature sensor 102T using different PN codes and transmits the four modulated transmission data items by time division multiplexing.

Note that, as the communication protocol of the wireless communication section 105, the Bluetooth (registered trademark) has been used. However, this is a mere example and a communication protocol in another wireless communication system can also be used. For example, a communication protocol for a wireless LAN using a communication protocol (such as IEEE 802.11b) for an IEEE 802.11 series can also be used.

As the antenna 106, an antenna based on the communication protocol used by the wireless communication sections 105 is used. The antenna 106 wirelessly outputs the transmission data output from each of the wireless communication sections 105 to an outer space.

Next, a description will be given of the monitor device 120. The monitor device 120 includes an antenna 121, a wireless communication section 122 (reception section), a control section 123, a display section 126, a storage section 127, and an operation section 128. As the antenna 121, an antenna based on the communication protocol used by the wireless communication sections 105 is used. The antenna 121 receives the transmission data wirelessly transmitted from each of the measurement units 101 and outputs the transmission data to the wireless communication section 122.

The wireless communication section 122 is configured of a communication module having the same communication protocol as the communication protocol of the wireless communication sections 105. On each reception of the transmission data via the antenna 121, the wireless communication section 122 demodulates the received transmission data and outputs the transmission data to the control section 123. Note that the wireless communication section 122 has preliminarily recognized the communication identifier of each of the wireless communication sections 105 and the PN code used by each of the wireless communication sections 105. Accordingly, the wireless communication section 122 determines, from the communication identifier of the transmitter included in the received transmission data, which one of the wireless communication sections 105 has transmitted the received transmission data. Then, the wireless communication section 122 demodulates the received transmission data using the PN code determined in advance for the wireless communication section 105 that has made the determination and outputs the transmission data to the control section 123. For example, it is assumed that a PN code PNk has been allocated to a given wireless communication section 105k. In this case, the wireless communication section 122 demodulates the transmission data transmitted from the wireless communication section 105k using the PN code PNk.

The control section 123 is configured of, e.g., a microcomputer including a CPU, a ROM, and a RAM or a dedicated hardware circuit such as an ASIC and includes a data management section 124 and an abnormality determination section 125. On each acquisition of the transmission data output from the wireless communication section 122, the data management section 124 extracts measurement values from the acquired transmission data, categorizes the extracted measurement values using the identification information included in the transmission data, and causes the display section 126 to display the categorized measurement values in chronological order. As a result, on the display section 126, the measurement values resulting from the measurement by the distortion sensors 102X, 120Y, and 102Z and the temperature sensor 102T in each of the measurement units 101 (blade portions 202) are displayed in real time.

Figure 6:
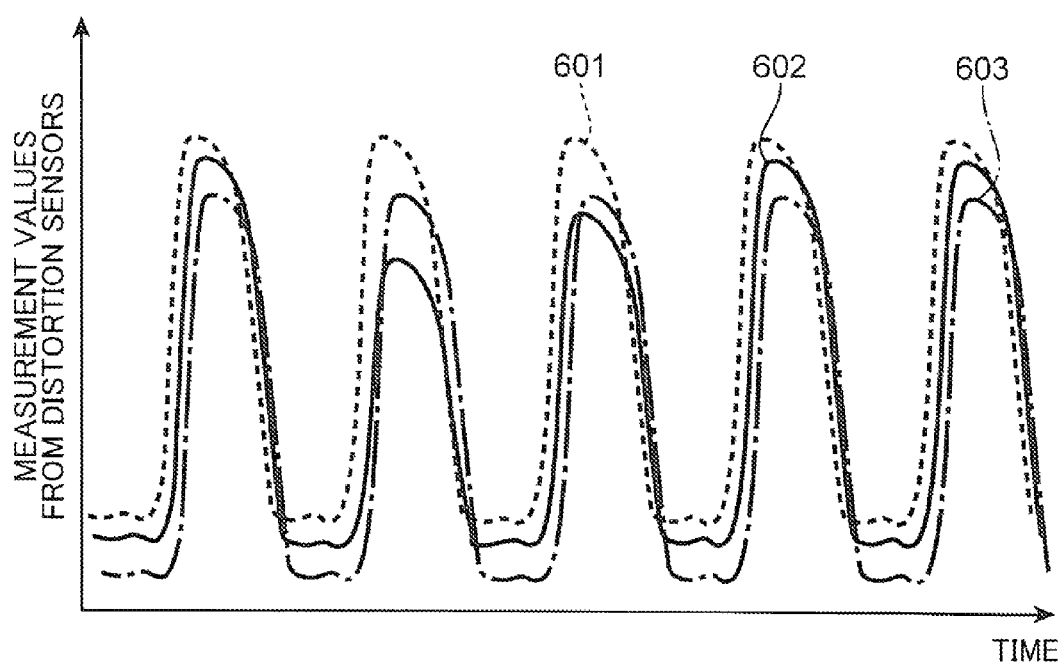
FIG. 6 is a graph showing the result of measurement by distortion sensors attached to a given one of the blade portions.
Figure 7:
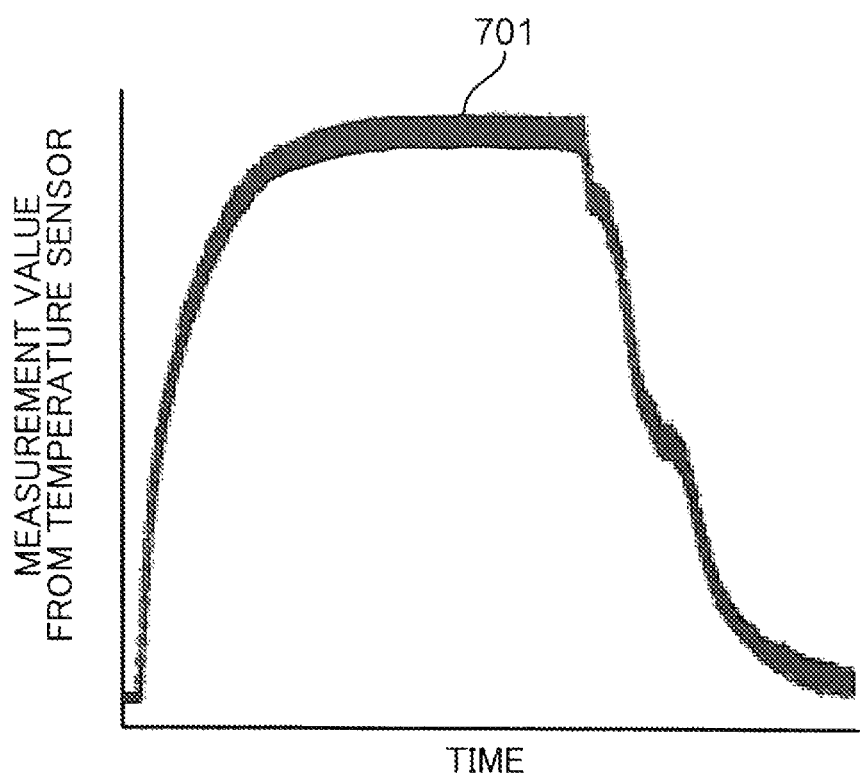
FIG. 7 is a graph showing the temporal transition of a measurement value from a temperature sensor.

Here, in displaying the measurement values in chronological order, the data management section 124 may display the graphically represented measurement values on the display section 126 or directly display the measurement values on the display section 126 without any alteration. As a form of the graphic representation, a two-dimensional graph in which the ordinate axis shows the measurement values and the abscissa axis shows a time may be used appropriately, as shown in FIGS. 6 and 7. The data management section 124 also causes the storage section 127 to store the measurement values in chronological order. In this case, the data management section 124 may appropriately associate the categorized measurement values with the identification information and with measurement times (e.g., the times when the measurement values are received from the wireless communication section 122) and cause the storage section 127 to store the categorized measurement values. With this, it is possible to promptly identify when the previous measurement value was obtained and the sensor and the blade portion 202 each used to provide the previous measurement value.

The abnormality determination section 125 compares each of the measurement values received by the wireless communication section 122 to a predetermined reference value and determines the presence or absence of an abnormality at the corresponding blade portion 202 on the basis of the result of the comparison. Here, the abnormality determination section 125 receives the measurement values categorized by the data management section 124 for each identification information item, compares each of the categorized measurement values to the reference value, and determines the presence or absence of an abnormality at the blade portion. Here, as the reference value, e.g., the average value of the measurement values from each of the distortion sensors 102X, 102Y, and 102Z and the temperature sensor 102T over a given previous period which are stored in the storage section 127 may be used. Alternatively, as the reference value, e.g., a value assumed in advance as a normal measurement value resulting from measurement by each of the distortion sensors 102X, 120Y, and 102Z and the temperature sensor 102T may also be used.

The display section 126 is configured of a display device such as, e.g., a liquid crystal panel or an organic EL panel to display the measurement values output from the data management section 124 in real time. The storage section 127 is configured of, e.g., a nonvolatile storage device to store the measurement values categorized by the data management section 124 in chronological order.

The operation section 128 is configured of an input device such as, e.g., a keyboard or a mouse to receive an operation instruction from an operator. Examples of the operation instruction include an operation instruction to cause the display section 126 to display the measurement values over a given previous period which are stored in the storage section 127, an operation instruction to cause the display section 126 to display the measurement values resulting from the measurement performed in each of the measurement units 101 in real time, and the like.

Next, a description will be given of a cutting tool the state of which is measured by the state measuring device in the present invention. FIG. 2 is a view showing a cutting tool 200 serving as a measurement target, in which Section (A) is a cross-sectional view when cutting was performed along the front-rear direction of the cutting tool 200 and Section (B) is a front view of the cutting tool 200. Note that, in FIG. 2, a forward direction indicates a direction extending from the center of the cutting tool 200 to the front side and a rearward direction indicates a direction extending from the center of the cutting tool 200 to the rear side. When collectively referred to, the forward direction and the rearward direction are referred to as the front-rear direction. A leftward direction indicates a direction to the left side when the cutting tool 200 is viewed from the front and a rightward direction indicates a direction to the right side when the cutting tool 200 is viewed from the front. When collectively referred to, the leftward direction and the rightward direction are referred to as a left-right direction. An upward direction indicates a direction to the upper side when the cutting tool 200 is viewed from the front and a downward direction indicates a direction to the lower side when the cutting tool 200 is viewed from the front. When collectively referred to, the upward direction and the downward direction are referred to as an upper-lower direction.

Note that, when a center axis C1 is used as a reference, the cutting tool 200 has a symmetrical shape so that there is no distinction between the left and right sides and between the upper and lower sides. However, for the purpose of illustration, the left-right direction and the upper-lower direction are defined.

As shown in Section (A) of FIG. 2, the cutting tool 200 includes the holder 201 and the blade portions 202. The holder 201 includes a substantially cylindrical front region, a cylindrical rear region having a radius smaller than that of the front region, and a tapered middle region connecting the front region and the rear region. In the front and middle regions of the holder 201, the space portion 205 is formed. The space portion 205 has a cylindrical shape coaxial with the center axis C1 of the holder 201. In the space portion 205, the circuit board 206 is provided. The circuit board 206 is in the form of, e.g., a disc and provided in the space portion 205 such that the main surface thereof faces the front. On the circuit board 206, the AD converter 103, the processing section 104, the wireless communication section 105, and the antenna 106 which are included in each of the measurement units 101 shown in FIG. 1 are mounted.

In front of the space portion 205, a sealing portion 208 having a flat plate shape and sealing the space portion 205 is provided. The sealing portion 208 is configured of, e.g., polycarbonate. Behind the space portion 205, a flange-like connecting portion 207 is provided. To a shaft portion provided behind the connecting portion 207, the main body portion of the machine tool the illustration of which is omitted is connected. A rotative force is transmitted from the machine tool to the holder 201 via the connecting portion 207 so that the cutting tool 200 rotates around the center axis C1.

As shown in Section (B) of FIG. 2, the holder 201 has a substantially circular shape when viewed from the front and has six protruding portions 204 formed to protrude in a radial direction. However, six is an example of the number of the protruding portions 204. Any number of one or more may be used appropriately as the number of the protruding portions 204. To the left side surface of each of the protruding portions 204, the blade portion 202 is attached via a seat 203.

For the blade portion 202, the X-, Y-, and Z-axes are defined. The X-axis shows the radial direction of the holder 201 when the holder 201 is viewed from the front surface thereof. The Y-axis shows a direction orthogonal to the X-axis in the front surface of the holder 201, i.e., the direction of a tangent line to the circumference of the circumscribed circle around the front surface of the holder 201. The Z-axis shows a direction parallel to the front-rear direction.

Figure 3:
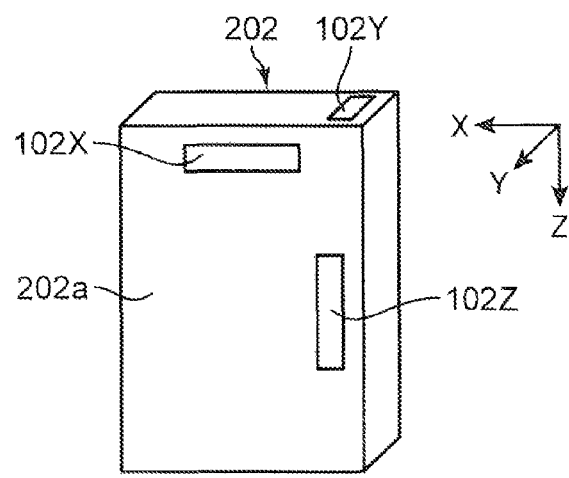
FIG. 3 is a view showing a general overview of each of blade portions when viewed from the back surface thereof.

FIG. 3 is a view showing a general overview of each of the blade portions 202 when viewed from a back surface 202a. The back surface 202a indicates the surface of the blade portion 202 facing the seat 203. The blade portion 202 has a generally rectangular parallelpiped shape in the form of a flat plate. To the back surface 202a, the distortion sensors 102X and 102Z are attached. To the upper surface of the blade portion 202, the distortion sensor 102Y is attached. Here, the distortion sensors 102X, 102Y, and 102Z are attached to the blade portion 202 such that the respective longitudinal directions thereof face along the X-, Y-, and Z-axes. This allows the distortion sensors 102X, 102Y, and 102Z to measure the distortion of the blade portion 202 along the X-, Y-, and Z-axes.

Figure 4:
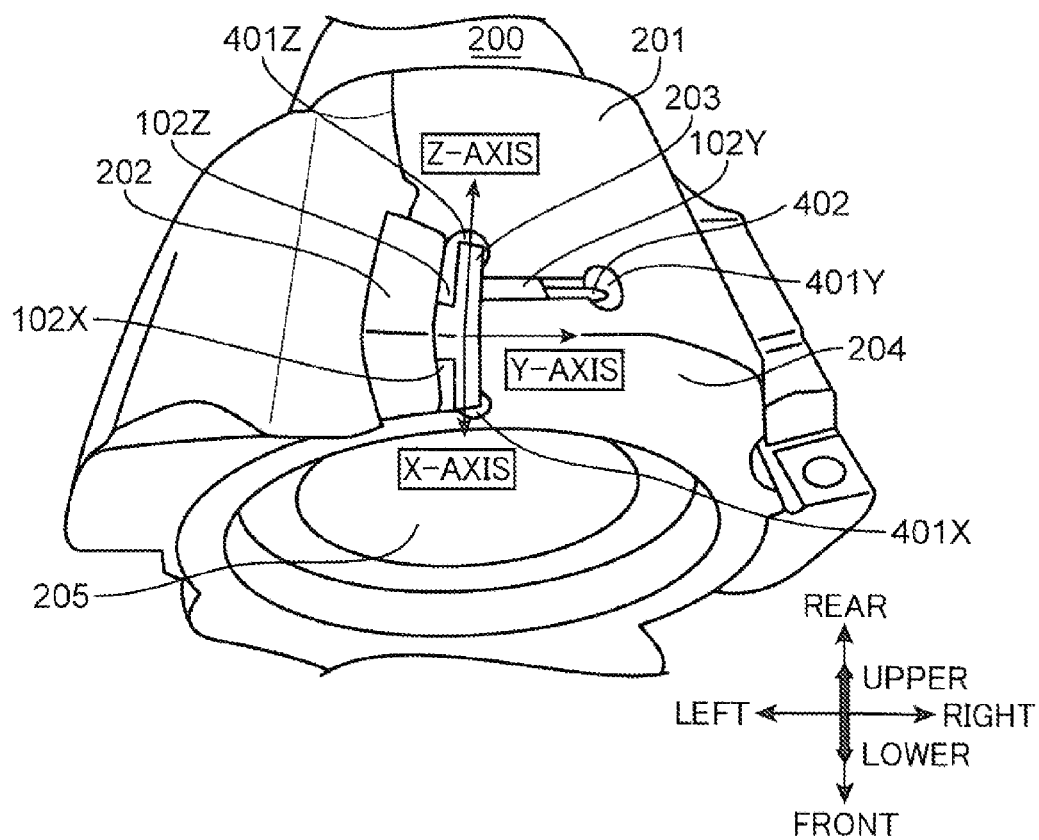
FIG. 4 is a perspective view of the cutting tool.

FIG. 4 is a perspective view of the cutting tool 200. In the example in FIG. 4, in the upper surface of the seat 203, a groove having a longitudinal direction along the Z-axis is formed along the blade portion 202. Into the groove, the distortion sensor 102Z has been attached so as to come into contact with the blade portion 202. At a position on the upper surface of the holder 201 which is spaced apart a predetermined distance from the seat 203 in the Z-axis direction, a hole 401Z is formed. The hole 401Z is in communication with the space portion 205 to allow a cable (the illustration of which is omitted) for electrically connecting the distortion sensor 102Z to the circuit board 206 to pass therethrough.

In the front surface of the seat 203, a groove having a longitudinal direction along the X-axis is formed along the blade portion 202. Into the groove, the distortion sensor 102X has been attached so as to come into contact with the blade portion 202. At a position on the front surface of the holder 201 which is spaced apart a predetermined distance from the seat 203 in the X-axis direction, a hole 401X is formed. The hole 401X is in communication with the space portion 205 to allow a cable (the illustration of which is omitted) for electrically connecting the distortion sensor 102X to the circuit board 206 to pass therethrough.

Note that, in FIG. 3, the distortion sensor 102Y is attached to the blade portion 202 while, in FIG. 4, the distortion sensor 102Y is attached between the seat 203 and a hole 401Y. Specifically, between the seat 203 and the hole 401Y, a groove along the Y-axis direction is formed and the distortion sensor 102Y has been attached into the groove. The hole 401Y is formed at a predetermined position on the upper surface of the holder 201 which is spaced apart a predetermined distance from the distortion sensor 102Y along the Y-axis. The hole 401Y is in communication with the space portion 205 to allow a cable 402 for electrically connecting the distortion sensor 102Y to the circuit board 206 to pass therethrough.

Thus, the distortion sensors 102X, 120Y, and 102Z may be attached to the blade portion 202 or may also be attached to any positions in the vicinity of the blade portion 202 except over the blade portion 202 where the distortion of the blade portion 202 can be measured. For example, it may also be possible that, in FIG. 3, two grooves using the X- and Z-axis directions as the respective longitudinal directions thereof are formed in the back surface 202a of the blade portion 202 and the distortion sensors 102X and 102Z are attached into the grooves. It may also be possible that a groove having longitudinal direction along the Y-axis is formed in the upper surface of the blade portion 202 and the distortion sensor 102Y is attached into the groove. It may also be possible that a groove is formed in the right side surface of the blade portion 202 and the temperature sensor 102T is attached into the groove. Note that the position to which the temperature sensor 102T is attached is not limited to the right side surface of the blade portion 202. The temperature sensor 102T may be attached to any position where the temperature of the blade portion 202 can be measured such as at the left side surface of the blade portion 202, the upper surface thereof, or the back surface 202a thereof. Also, the position to which the temperature sensor 102T is attached is not limited to the blade portion 202 and may also be a position in the vicinity of the blade portion 202 (for example, the position of the seat 203 or the position of the holder 201 which is in the vicinity of the blade portion 202).

Figure 5:
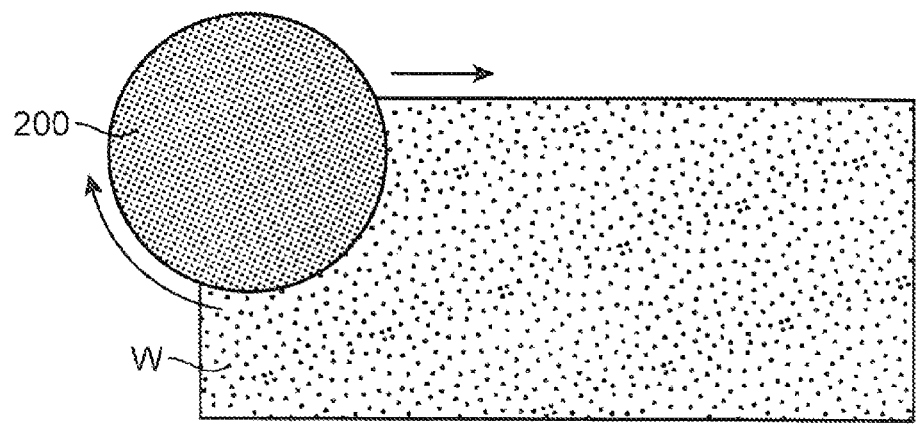
FIG. 5 is a view schematically showing the cutting of a workpiece using the cutting tool.

FIG. 5 is a view schematically showing the cutting of a workpiece W using the cutting tool 200. As the workpiece W, metal in the form of a flat plate is used. The cutting tool 200 receives power from the main body (the illustration of which is omitted) of the machine tool to move in the longitudinal direction of the workpiece W, while rotating, e.g., clockwise, to work the workpiece W into a predetermined shape. In the example in FIG. 5, the cutting tool 200 forms four holes in the surface of the workpiece W.

FIG. 6 is a graph showing the result of measurement by the distortion sensors 102X, 102Y, and 102Z attached to a given one of the blade portions 202. In FIG. 6, the ordinate axis shows measurement values from the distortion sensors 102X, 102Y, and 102Z and the abscissa axis shows a time.

Also, in FIG. 6, graphs 601, 602, and 603 show the respective temporal transitions of the measurement values from the distortion sensors 102X, 102Y, and 102Z. As shown in FIG. 6, the cutting tool 200 cuts the workpiece W, while rotating at a given speed, so that, when attention is focused on one of the blade portions 202, a period during which the blade portion 202 comes into contact with the workpiece W and a period during which the blade portion 202 moves away from the workpiece W alternate so that the two periods are periodically observed. As a result, each of the graphs 601 to 603 has a pulsing waveform in which the amplitude increases when the blade portion 202 comes into contact with the workpiece W and the amplitude decreases when the blade portion 202 moves away from the workpiece W.

When attention is focused on the graph 602, in the second pulse, the amplitude is significantly smaller than in the first, third, fourth, and fifth pulses and it can be seen that any abnormality has occurred. Accordingly, the abnormality determination section 125 senses, from the chronological data of the measurement values acquired in real time by the data management section 124, the amplitudes of the measurement values from the distortion sensors 102X, 102Y, and 102Z. Here, the abnormality determination section 125 may appropriately detect the amplitudes of the measurement values from the distortion sensors 102X, 102Y, and 102Z by detecting peaks from the chronological data of the measurement values. Then, the abnormality determination section 125 determines the difference between each of the detected amplitudes and a reference value and determines that an abnormality has occurred when the difference is larger than a reference difference value. When detecting that an abnormality has occurred, the abnormality determination section 125 causes the display section 126 to display information showing the occurrence of an abnormality. For example, when it is assumed that the abnormality determination section 125 has sensed the occurrence of an abnormality in the distortion sensor 102Y, the abnormality determination section 125 may cause the display section 126 to display words showing that an abnormality has occurred in the blade portion 202 to which the distortion sensor 102Y is attached, cause the display section 126 to display the entire screen in a predetermined color (e.g., red) to show the occurrence of an abnormality, or cause the display section 126 to show the occurrence of an abnormality by combining the two display methods shown above.

Note that the data management section 124 may appropriately display graphs as shown in FIG. 6 on the display section 126 in real time. That is, when measurement values are output from the wireless communication section 122, the data management section 124 may appropriately promptly plot the measurement values on the graphs and linearly connect the plotted measurement values to the adjacent measurement values to generate image data showing the graphs shown in FIG. 6 and display the image data on the display section 126. This allows the operator to recognize the occurrence of an abnormality in the distortion sensor from a change in the graphs displayed on the display section 126.

Note that, as the reference value, an average value of the amplitude over a given previous period based on the current time in a given one of the distortion sensors may be used or a predetermined assumed amplitude value may also be used.

Examples of an abnormality in the distortion sensor 102Y include uneven contact of only a part of the blade portion 202 with the workpiece W, biting of chips produced from the workpiece W during working by the blade portion 202, and the like.

In the example of FIG. 6, the occurrence of an abnormality is sensed by comparing the amplitudes of the measurement values to the reference value, but this is a mere example. The occurrence of an abnormality may also be sensed by directly comparing the measurement values to a reference value. In this case, when the differences between the measurement values and the reference value are larger than a predetermined difference threshold, the abnormality determination section 125 may appropriately determine that an abnormality has occurred.

FIG. 7 is a graph showing the temporal transition of a measurement value from the temperature sensor 102T. In FIG. 7, the ordinate axis shows the measurement value from the temperature sensor and the abscissa axis shows a time. A change in the temperature of the blade portion 202 has a responsiveness lower than that of a change in the distortion thereof. In the distortion change, every time the cutting tool 200 rotates one revolution, one peak is observed. As for the temperature change, when the cutting tool 200 starts to work the workpiece W, the temperature gradually increases and, when the working of one workpiece W is ended, the temperature gradually decreases. Accordingly, the period of a graph 701 shown in FIG. 7 is significantly larger than the periods of the graphs 601 to 603. When it is assumed that measurement values from the distortion sensors show a micro change in the state of the blade portion 202, a temperature change shows a macro change in the state of the blade portion 202. Accordingly, by monitoring the distortion and temperature of the blade portion 202 in real time, the state of the blade portion 202 can be monitored from the both micro and macro viewpoints.

Figure 8:
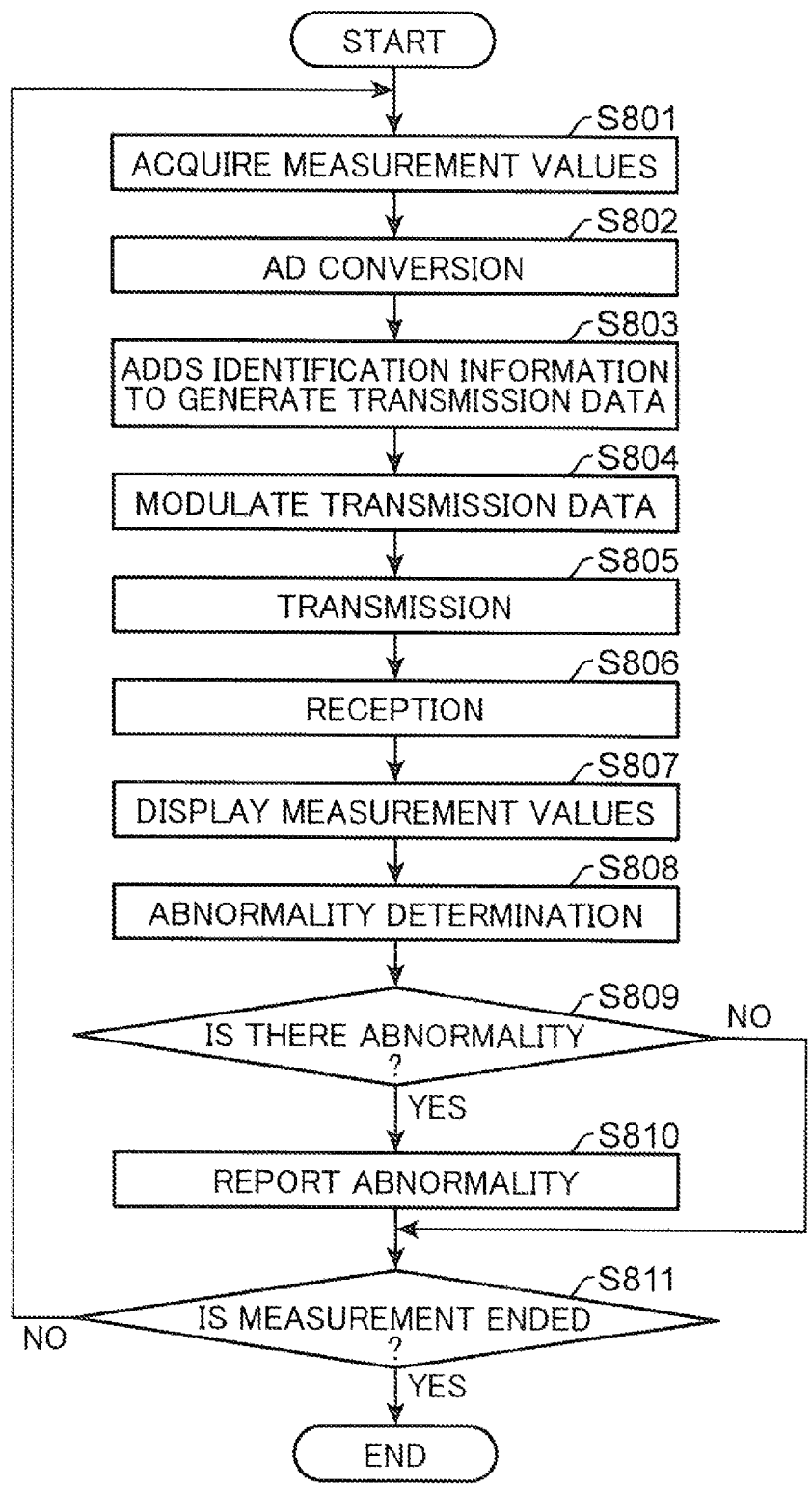
FIG. 8 is a flow chart showing an operation of the state measuring device according to the embodiment of the present invention.

FIG. 8 is a flow chart showing an operation of the state measuring device according to the embodiment of the present invention. First, when the timing for acquiring measurement values has come, the AD converters 103 acquire measurement values from the corresponding distortion sensors 102X, 102Y, and 102Z and the temperature sensor 102T (S801).

Next, the AD converters 103 perform AD conversion on the measurement values acquired from the distortion sensors 102X, 102Y, and 102Z and the temperature sensor 102T (S802) and output the measurement values to the processing section 104. Next, the processing section 104 adds identification information intrinsic to the individual sensors to the measurement values output from the AD converters 103 to generate transmission data (S803).

Next, the wireless communication section 105 modulates the transmission data (S804) and transmits the transmission data to the monitor device 120 via the antenna 106 (S805). Next, the wireless communication section 122 receives the transmission data via the antenna 121 (S806) and demodulates the received transmission data to the control section 123.

Next, the data management section 124 extracts the measurement values from the demodulated transmission data, categorizes the extracted measurement values by identification information, and causes the display section 126 to display the measurement values (S807). Next, the abnormality determination section 125 determines the differences between the measurement values and the reference value and determines whether or not an abnormality has occurred in the blade portion 202 (S808). When determining that an abnormality has occurred in the blade portion 202 (YES in S809), the abnormality determination section 125 then displays information showing the occurrence of an abnormality in the blade portion 202 on the display section 126.

Conversely, when determining that an abnormality has not occurred in the blade portion 202 (NO in S809), the abnormality determination section 125 advances the process to S811. Note that, when a form in which the abnormality determination section 125 determines the presence or absence of an abnormality by comparing the amplitudes of the measurement values to the reference value, the process in S808 to S810 is performed only when the amplitudes are sensed and may appropriately be skipped when the amplitudes are not sensed.

Next, when the measurement is not ended (NO in S811), the process is returned to S801 where the AD converters 103 acquire measurement values from the individual sensors again and the process including and subsequent to S801 is performed. On the other hand, when the measurement is ended (YES in S811), the process is ended. Here, examples of the case where the measurement is ended include the case where the operator operates the operation section 128 to input an instruction to end the measurement.

Thus, in the state measuring device according to the present embodiment, on each acquisition of measurement values from the distortion sensors 102X, 120Y, and 102Z and the temperature sensor 102T, the processing section 104 transmits the acquired measurement values to the monitor device 120 via the wireless communication section 105. Then, on each acquisition of the received measurement values, the monitor device 120 causes the display section 126 to display the acquired measurement values. As a result, on the display section 126, the state of the cutting tool during cutting is displayed in real time. This allows the operator to recognize the state of the cutting tool during cutting in real time.

In addition, since the wireless communication section 105 transmits the measurement values subjected to spectrum spreading modulation to the monitor device 120 by performing time division multiplexing, a large number of the measurement values can be transmitted to the monitor device 120. Accordingly, even when the number of the distortion sensors 102X to 102Z and the temperature sensors 102T is enormously large, the monitor device 120 can display the measurement values in real time.

The measurement values resulting from measurement by the distortion sensors 102X, 120Y, and 102Z and the temperature sensor 102T are stored in the storage section 127 of the monitor device 120. Therefore, by analyzing the measurement values stored in the storage section 127, it is possible to find and extract a point for improvement in a milling machine. Conventionally, it has not been performed in a milling machine to measure the state of a cutting tool during cutting and it has been common to measure the state of a cutting tool by computer simulation. Accordingly, the state of the cutting tool cannot precisely be measured, which is insufficient in extracting a point for improvement in the milling machine. In the present embodiment, the state of the cutting tool during cutting has been measured and stored in the storage section 127. This allows a point for improvement in the milling machine to be precisely extracted.

Also, in the present embodiment, on each acquisition of measurement values resulting from the measurement by the distortion sensors 102X, 102Y, and 102Z and the temperature sensor 102T, the processing section 104 transmits the measurement values to the monitor device 120 via the wireless communication section 105. Accordingly, it is sufficient to provide a buffer which temporarily stores the measurement values in the processing section 104 or the wireless communication section 105. This eliminates the need to provide a large-capacity storage device in the processing section 104 or the wireless communication section 105 and can consequently achieve a reduction in the cost of the device and the simplification thereof.

Note that, in FIG. 1, each of the measurement units 101 includes the three distortion sensors and the one temperature sensor, but this is a mere example. Each of the measurement units 101 may also be provided with distortion units the number of which is a predetermined number other than 3 such as 1, 2, 4, or 5. Each of the measurement units 101 includes the one temperature sensor, but this is also a mere example. Each of the measurement units 101 may also be provided with two or more temperature sensors. Also, in the embodiment, the distortion sensors and the temperature sensor are used as a measurement section, but this is a mere example. As the measurement section, a sensor of a type different from those of the distortion sensors and the temperature sensor may also be used. Examples of the different type of sensor include a humidity sensor which measures a humidity around the blade portion 202 as a state thereof, an image sensor which measures the image of the blade portion 202 as a state thereof, and a microphone which measures a cutting sound from the blade portion 202.

The state measuring device shown in FIG. 1 may also be configured as a state measuring system including the measurement units 101 and the monitor device 120 provided outside the measurement units 101 and communicably connected to the measurement units 101. In this case, the measurement units 101 and the monitor device 120 may also be connected via a communication line such as the Internet. Specifically, the measurement units 101 are connected to the Internet via a wireless LAN access point and the monitor device 120 is communicably connected to an Internet access point wiredly or wirelessly. In this case, the measurement values transmitted from the wireless communication section 105 of the measurement unit 101 are transmitted to the wireless LAN access point and transmitted to the monitor device 120 via the Internet.

Summarization of Embodiment

A state measuring device according to an aspect of the present invention is a state measuring device which measures a state of a cutting tool during cutting. The cutting tool is configured of a rotating body which has one or more blade portions and brings each of the blade portions into contact with a workpiece while rotating, to work the workpiece. The state measuring device includes one or more measurement sections attached to the blade portion or to a vicinity of the blade portion to measure a state of the blade portion, an AD converter attached to the cutting tool to acquire a measurement value measured by each of the measurement sections at a predetermined sampling rate and perform AD conversion on the measurement value, a transmission section which transmits, on each acquisition of the measurement value from the AD converter, the acquired measurement value using digital wireless communication, and a monitor device provided outside the cutting tool. The monitor device includes a reception section which receives the measurement value transmitted by the transmission section, and a data management section which causes a display section to display the measurement value and causes a storage section to store the measurement value on each reception of the measurement value by the reception section.

In this configuration, the measurement value showing the state of the blade portion resulting from the measurement by the measurement section attached to each of the blade portions or to the vicinity of each of the blade portions is subjected to the AD conversion at the predetermined sampling rate and the transmission section transmits the measurement value to the monitor device on each acquisition of the measurement value subjected to the AD conversion. On the other hand, on each reception of the measurement value, the monitor device displays the measurement value on the display section. As a result, the display section can display the measurement value from the cutting tool during cutting in real time. This allows an operator to recognize the state of the cutting tool during cutting in real time. In addition, since the monitor device stores the acquired measurement value in the storage section, by analyzing the stored measurement value, it is possible to find a point for improvement in the cutting tool during cutting.

In the configuration, each of the measurement sections may be present for each of the blade portions, and the transmission section may add identification information determined in advance for each of the measurement sections to the measurement value, and transmits the measurement value to the monitor device.

In this configuration, the identification information determined in advance for each of the measurement sections is added to the measurement value resulting from the measurement by the measurement section and the measurement value is transmitted to the monitor device. This allows the monitor device to recognize the measurement section and the blade portion each used to provide the measurement value.

In the configuration, each of the measurement sections may be configured of a distortion gauge or a piezoelectric element.

This configuration allows a change in the shape of the blade portion to be easily measured as a state using the distortion gauge or piezoelectric element. In addition, in this configuration, the measurement section is configured of the distortion gauge or piezoelectric element. This allows the state of the blade portion to be measured with high resolution.

Also, in the configuration, each of the measurement sections may further include a temperature sensor which measures a temperature of each of the blade portions.

This configuration allows not only a change in the shape of the blade portion but also the temperature of the blade portion to be measured as a state.

Also, in the configuration, the transmission section may modulate the measurement value by spectrum spreading and transmits the modulated measurement value by time division multiplexing.

This configuration allows a large number of the measurement values to be displayed on the monitor device.

Also, in the configuration, an abnormality determination section may further be included which compares the measurement value received by the reception section to a predetermined reference value, determines the presence or absence of an abnormality in the blade portion on the basis of a result of the comparison, and displays, when determining the presence of the abnormality, information showing the occurrence of the abnormality on the display section.

In this configuration, when an abnormality has occurred during cutting, the occurrence of the abnormality is promptly reported to the operator. This can prevent the production of a defective product in advance.

In the configuration, the reference value may be information calculated from a previous measurement value stored in the storage section.

In this configuration, an abnormality in the blade portion is detected by comparing the current measurement value to the previous measurement value. This allows an abnormality in the blade portion to be detected without preliminarily giving a reference value to the state measuring device.

A state measuring system according to another aspect of the present invention is a state measuring system which measures a state of a cutting tool during cutting. The cutting tool is configured of a rotating body which has one or more blade portions and brings each of the blade portions into contact with a workpiece while rotating, to work the workpiece. The state measuring system includes one or more measurement units provided at the cutting tool to correspond to the individual blade portions, and a monitor device provided outside the measurement units and communicably connected to the measurement units. Each of the measurement units includes a measurement section attached to the blade portion or to a vicinity of the blade portion to measure a state of the blade portion, an AD converter attached to the cutting tool to acquire a measurement value measured by the measurement section at a predetermined sampling rate and perform AD conversion on the measurement value, and a transmission section which transmits, on each acquisition of the measurement value from the AD converter, the acquired measurement value using digital wireless communication. The monitor device includes a reception section which receives the measurement value transmitted by the transmission section, and a data management section which causes a display section to display the measurement value and causes a storage section to store the measurement value on each reception of the measurement value by the reception section.

The invention claimed is:

1. A state measuring device which measures a state of a cutting tool during cutting, the cutting tool being configured of a rotating body which has one or more blade portions and brings each of the blade portions into contact with a workpiece while rotating, to work the workpiece, the state measuring device comprising:
   one or more measurement sections attached to the blade portion or to a vicinity of the blade portion to measure a state of the blade portion;
   an AD converter attached to the cutting tool to acquire a measurement value measured by each of the measurement sections at a predetermined sampling rate and perform AD conversion on the measurement value;
   a transmission section which transmits, on each acquisition of the measurement value from the AD converter, the acquired measurement value using digital wireless communication; and
   a monitor device provided outside the cutting tool, wherein
   the monitor device includes:
   a reception section which receives the measurement value transmitted by the transmission section; and
   a data management section which causes a display section to display the measurement value and causes a storage section to store the measurement value on each reception of the measurement value by the reception section, and wherein
each of the measurement sections is present for each of the blade portions, and
the transmission section adds identification information determined in advance for each of the measurement sections to the measurement value, and transmits the measurement value to the monitor device.

2. The state measuring device according to claim 1, wherein each of the measurement sections is configured of a distortion gauge or a piezoelectric element.

3. The state measuring device according to claim 1, wherein each of the measurement sections includes a temperature sensor which measures a temperature of each of the blade portions.

4. The state measuring device according to claim 1, wherein the transmission section modulates the measurement value by spectrum spreading and transmits the modulated measurement value by time division multiplexing.

5. A state measuring device which measures a state of a cutting tool during cutting, the cutting tool being configured of a rotating body which has one or more blade portions and brings each of the blade portions into contact with a workpiece while rotating, to work the workpiece, the state measuring device comprising:
one or more measurement sections attached to the blade portion or to a vicinity of the blade portion to measure a state of the blade portion;
an AD converter attached to the cutting tool to acquire a measurement value measured by each of the measurement sections at a predetermined sampling rate and perform AD conversion on the measurement value;
a transmission section which transmits, on each acquisition of the measurement value from the AD converter, the acquired measurement value using digital wireless communication;
a monitor device provided outside the cutting tool; and
an abnormality determination section which compares the measurement value received by the reception section to a predetermined reference value, determines the presence or absence of an abnormality in the blade portion on the basis of a result of the comparison, and displays, when determining the presence of the abnormality, information showing the occurrence of the abnormality on the display section, wherein
the monitor device includes:
a reception section which receives the measurement value transmitted by the transmission section; and
a data management section which causes a display section to display the measurement value and causes a storage section to store the measurement value on each reception of the measurement value by the reception section.

6. The state measuring device according to claim 5, wherein the reference value is information calculated from a previous measurement value stored in the storage section.

7. A state measuring system which measures a state of a cutting tool during cutting, the cutting tool being configured of a rotating body which has one or more blade portions and brings each of the blade portions into contact with a workpiece while rotating, to work the workpiece, the state measuring system comprising:
one or more measurement units provided at the cutting tool to correspond to the individual blade portions; and
a monitor device provided outside the measurement units and communicably connected to the measurement units, wherein
each of the measurement units includes:
a measurement section attached to the blade portion or to a vicinity of the blade portion to measure a state of the blade portion;
an AD converter attached to the cutting tool to acquire a measurement value measured by the measurement section at a predetermined sampling rate and perform AD conversion on the measurement value; and
a transmission section which transmits, on each acquisition of the measurement value from the AD converter, the acquired measurement value using digital wireless communication, and
the monitor device includes:
a reception section which receives the measurement value transmitted by the transmission section; and
a data management section which causes a display section to display the measurement value and causes a storage section to store the measurement value on each reception of the measurement value by the reception section, and
wherein
the transmission section adds identification information determined in advance for the measurement section to the measurement value, and transmits the measurement value to the monitor device.

* * * * *